Dec. 6, 1955   J. L. ALLISON   2,726,387
BEARING SIGNAL QUALITY DETECTOR
Filed March 12, 1954                                        2 Sheets—Sheet 1
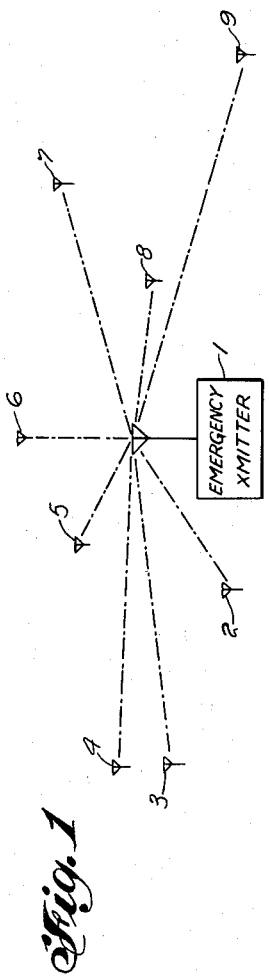
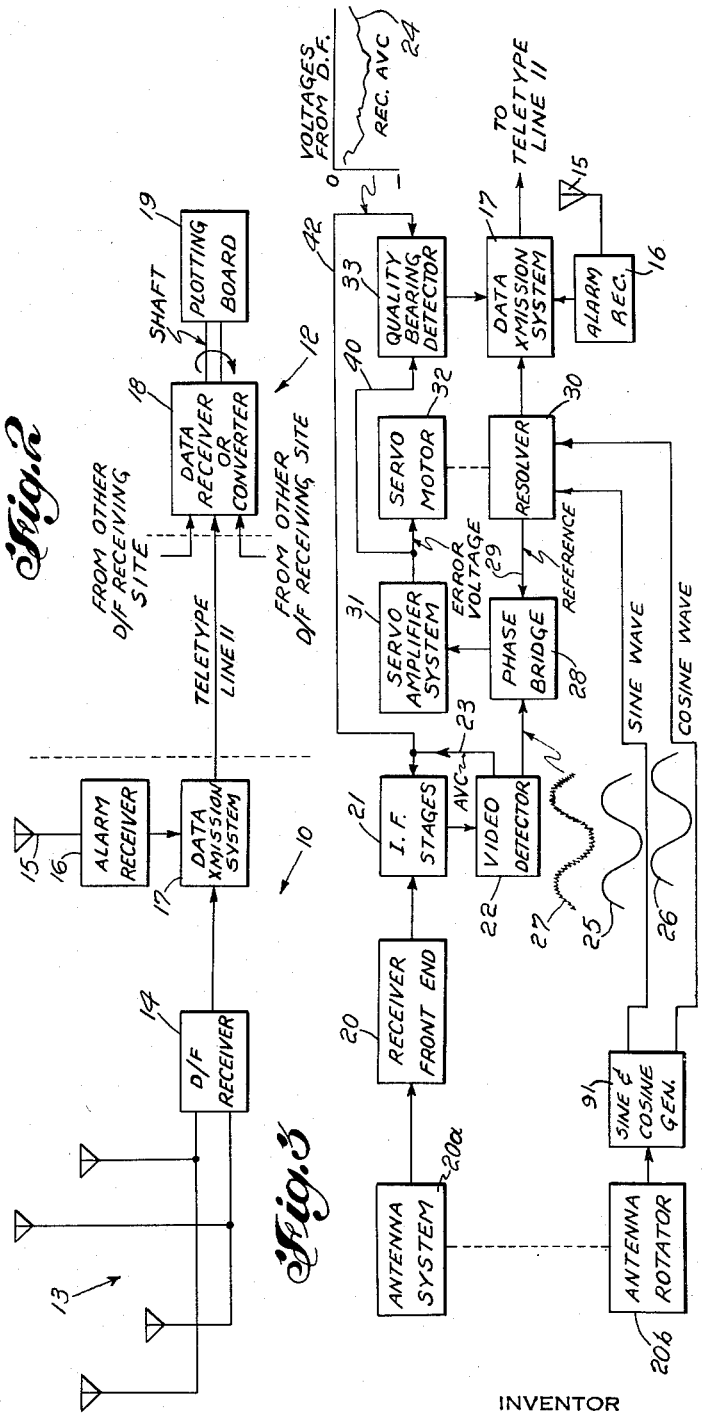
INVENTOR
JOHN L. ALLISON
BY
ATTORNEY Dec. 6, 1955  J. L. ALLISON  2,726,387
BEARING SIGNAL QUALITY DETECTOR
Filed March 12, 1954  2 Sheets-Sheet 2

INVENTOR
JOHN L. ALLISON
BY Ernest Fannick
ATTORNEY

United States Patent Office 2,726,387
Patented Dec. 6, 1955

2,726,387

BEARING SIGNAL QUALITY DETECTOR

John L. Allison, Nutley, N. J., assignor to International Telephone and Telegraph Corporation, Nutley, N. J., a corporation of Maryland Application March 12, 1954, Serial No. 415,763

11 Claims. (Cl. 343—113)

This invention relates to direction finding receiving systems and more particularly to apparatus capable of yielding an indication of the quality of a bearing signal detected by a receiver of a direction finding receiving system.

In order to quickly and accurately determine the bearing of radio signals radiated by a transmitter, such as may be carried by an airplane or ship, it is desirable that there be provided a plurality of receiving sites each including a complete direction finding receiving system. Since only on relatively infrequent occasions will emergencies arrive when these systems will be utilized to locate a given transmitter, it is almost essential that the receiving system at each site be completely automatic. Since many bearing signals may be received, each by a different receiving system at a different site, it is necessary to evaluate the reliability and dependability of each of the signals in order to weigh its information content when locating the transmitter. Since it is desired to have the receiving systems completely automatic and unattended at sites remote from the central control station, it is necessary that the bearing quality determination be made automatically.

It has generally been considered heretofore that a skilled operator is necessary to intelligently evaluate and determine bearing signal quality. However, I have found that certain signals present in a direction finding receiving system can be utilized to automatically yield an intelligent evaluation of signal bearing quality.

It is an object of this invention, therefore, to provide an indication proportional to the reliability or quality of a direction finder's received bearing signal.

Another object of this invention is to provide apparatus which yields an indication of the ratio of the magnitudes of two input voltages.

It is another object of this invention to provide apparatus which utilizes a combination of received signal strength and servo amplifier output voltage to provide a signal indicative of bearing signal quality.

It is still another object of this invention to provide apparatus which uses the automatic volume control voltage present in a direction finder receiver in conjunction with the error voltage controlling the servo system motor of an automatic direction finding system to yield an indication of the quality of the bearing signal.

One of the features of this invention is apparatus for use in a direction finding receiving system having a direction finder receiver including an automatic volume control circuit and a servo control system including a servo motor responsive to an error voltage which expresses the quality, that is, evaluates the reliability of a bearing signal responsive to the ratio of the direction finder receiver automatic volume control voltage, which is proportional to signal strength, and to the activity of the servomotor, which is proportional to bearing swing, over a predetermined period. The servomotor voltage is applied in varying amounts in opposition to the automatic volume control voltage, hereinafter termed AVC. As long as the AVC voltage exceeds the servomotor voltage over the predetermined period, a first degree of quality indication is obtained, but if at some time during the predetermined period the servo voltage exceeds the AVC voltage by a predetermined amount a second degree of quality indication is obtained. This degree of quality indication yield is continued through the various predetermined ratios of AVC voltage to servomotor voltage, to yield a plurality of additional degrees of quality indication.

The above-mentioned and other features and objects of this invention will become more apparent by reference to the following description taken in conjunction with the accompanying drawings, in which:

Fig. 1 is an illustration in schematic form of one embodiment of a direction finding system;

Fig. 2 is a diagram in block form of one of a plurality of direction finding receiving stations used in the system shown in Fig. 1;

Fig. 3 is a schematic diagram in block form of one embodiment of a direction finder receiver for use in the receiving system shown in Fig. 2; and, Fig. 4 is a schematic circuit diagram of one embodiment of a bearing signal quality detector in accordance with the principles of my invention for use in direction finding systems.

Figure 4:
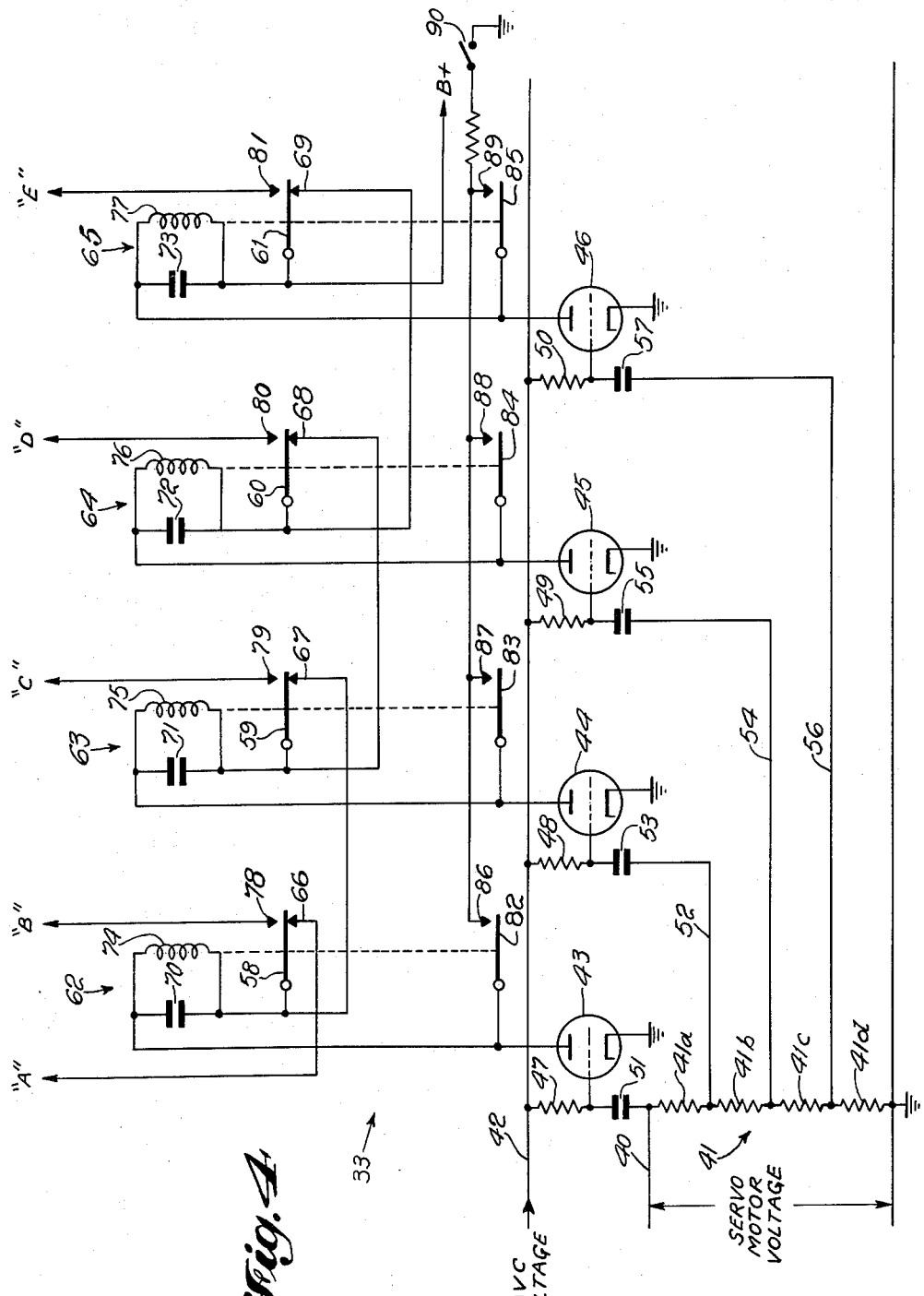

Referring to Fig. 1, there is therein shown a schematic illustration of one embodiment of a typical direction finding system used to obtain the direction of transmission emanating from disabled planes or ships and to aid in the emergency rescue thereof. The over-all air-sea rescue program has been set up for the purpose of saving lives of those involved in accidents. An emergency transmitter 1 is carried by the airplane or ship and is arranged to be jettisoned either manually prior to or automatically upon impact of the aircraft with the ground. The transmitter 1, upon release, automatically sends out a series of signals identifying itself and also useful for direction finding purposes. A plurality of direction finding receiving sites 2—9 are provided each of which has located thereat a direction finding receiver system. Each of the direction finding receiving sites 2—9 is designed to obtain the azimuth to transmitter 1 by use of the bearing signal transmissions emanating from the emergency transmitter 1. A central control station (not shown) coordinates the bearings obtained at each of the plurality of sites 2—9 and through a process of triangulation determines the location of the emergency transmitter 1.

Since emergency rescue direction finding operations are performed only at infrequent intervals it is necessary that each of the direction finding receiving systems be completely automatic and capable of unattended operation. Automatic and unattended operation requires that all information received at the direction finding receiving site be conveyed to a central control station. It is apparent from known techniques and illustrated in Fig. 1 that the best triangulation "fix" is obtained from receiving sites such as 2 and 5 whose bearing lines intersect at a satisfactory angle due to their wide azimuth spacing around the transmitter and capable of receiving the strongest signal due to their proximity to the transmitter 1. When operators are utilized, the quality of the determined bearing can be detected at each direction finding site and sent to the control station with other information so that the control station is able to weigh the bearing determined at each receiving site in accordance with its detected quality. By weighing the bearing determined at each receiving site a more accurate position of the transmitter location is possible. However, when the direction finding receiving station's operation is completely automatic and unattended it is necessary to provide equipment which is capable of automatically evaluating or detecting the degree of quality of the received bearing signal.

Referring to Fig. 2 of the drawing, one embodiment of a typical direction finding receiving system for use in emergency rescue operations is shown to comprise a direction finding receiving station 10 whose output is conveyed over a teletype line 11 to a central control station 12. The direction finding receiving station 10 is one of a plurality of stations cooperating with the central control station 12. Each direction finding receiving station 10, as shown in Fig. 2, includes a direction finding antenna system 13 which receives the transmissions emanating from the emergency transmitter 1 and couples the signals to a direction finder receiver 14. Simultaneously with the reception of the signals from the emergency transmitter by the antenna system 13, another antenna 15 receives the signals and couples them to an alarm receiver 16 whose output alerts the data transmitter system 17 and causes it to be ready to accept the output of the direction finder receiver 14. The output of the direction finder receiver 14, comprising an indication of the received signal bearing along with a signal indicative of the degree of bearing signal quality, as hereinafter explained, is coupled to the alerted data transmitter system 17 where the signals are converted to electrical impulses suitable for transmission over a wire circuit, such as a teletype line 11. The signals from direction finding receiving station 10 along with the signals from all other receiving stations cooperating with the central control station 12 are coupled into a data receiver or converter 18 where the electrical impulses conveyed over the wire circuits are converted into energy suitable to actuate a plotting board 19. The plotting board 19 is designed to weigh each of the received bearing signals in accordance with its quality and thus yield the most probable location of the transmitter radiating the bearing signals.

Fig. 3 of the drawing is a schematic diagram in block form of one embodiment of a direction finder receiver for use in the direction finding receiving system 10 shown in Fig. 2 and is seen to comprise the usual receiver front end circuitry 20 which has the signal picked up by a direction finder antenna system 20a coupled to it. The antenna system 20a has its direction of reception varied in response to antenna rotator 20b. The output of the receiver front end 20 is coupled to the intermediate frequency (IF) stages 21. The output of the IF stages 21 is coupled to the video detector circuitry 22. A feedback loop 23 obtains an automatic volume control voltage, as shown in curve 24, from the video detector circuitry 22 and couples it back to the IF stages 21 to adjust the bias thereof according to the detected signal strength. As will be readily apparent to those skilled in the art of radio receivers there are numerous means for obtaining and utilizing an automatic volume control signal and it is not my intention to be limited to any specific means or circuitry for obtaining an automatic volume control signal, i. e., a signal proportional to signal strength, which may be described herein by way of illustration only.

As is common in direction finder receivers sine wave and cosine wave 25 and 26 are generated responsive to the antenna rotator 20b and thus are related to the rotation of the direction of reception of the antenna system 20a. The detected signal 27 obtained at the output of video detector 22 is coupled to a phase bridge 28 which compares the phase of the detected signal 27 with the phase of the reference signal output coupled over line 29 from resolver 30 to which the sine wave and cosine wave 25 and 26 were coupled. The output of the phase bridge 28 comprises a signal which is proportional to the difference in phase between the signals coupled into the bridge 28 and is thus an indication of the bearing of the transmitter responsible for the received signal. The output of the phase bridge 28 is amplified by a servo amplifier 31 whose output voltage drives a servomotor 32 coupled to resolver 30. Obviously if the signal inputs to bridge 28 are in phase no voltage is coupled to the servomotor 32 and no movement is imparted to the resolver 30. The system remains at rest until a phase difference between its input signals is detected by bridge 28 and then an error signal is developed which is amplified and drives the servomotor 32 to cause the resolver 30 to move to its neutral or rest position. The amount of movement of resolver 30 to cause the reference and detected signals coupled to the bridge 28 to be in phase is indicative of the bearing of the received signal. This indication is coupled from the resolver 30 to the data transmission system 17 where the signal is encoded to make it suitable for transmission over a wire circuit 11 to the central control station.

The output of the servo amplifier 31, i. e., the error voltage or the servomotor voltage, is proportional to the acceleration of the servo system. A short, rapid bearing swing is associated with a higher servo amplifier output voltage than a long, slow bearing swing. It has long been known that a signal which results in a widely swinging bearing output of a direction finder receiver is far less dependable than a signal which yields a stationary or slowly swinging bearing output for the direction finder receiver. Thus the larger the output of the servo amplifier error voltage the less dependable is the bearing of the detected signal. It is also well known that when a direction finder receiver detects a strong signal the bearing which is determined is more dependable than the bearing indication resulting from a weak signal. As is readily recognized by those skilled in the art the AVC voltage is a measure of the strength of the received signal and is thus an indication of the degree of dependability of the received signal. I have found that the degree of bearing quality is most reliably indicated when the error voltage and the AVC voltage are both utilized to indicate the bearing quality.

In accordance with my above discovery the direction finder receiver of Fig. 3 has a portion of the error voltage or output of the servo amplifier 31 coupled to a bearing quality detector 33 along with a signal proportional to the AVC voltage 24. The output of detector 33 which is indicative of a degree of reliability or quality of the bearing indication from resolver 30 is coupled to the data transmission system 17 for transmittal to the central control station.

Referring to Fig. 4 of the drawing a schematic circuit diagram of one embodiment of a bearing signal quality detector in accordance with the principles of my invention is shown for detecting the degree of bearing quality in response to the AVC voltage and the servo amplifier voltage output of a direction finder receiver such as is shown in Fig. 3. The voltage which drives the servomotor 32, i. e., the servomotor voltage or the error voltage from phase bridge 28 which has been amplified by servo amplifier 31, comprises one input to the bearing quality detector of this invention and is coupled between line 40 and ground and thus is effectively coupled across the voltage divider 41. The other input to the bearing signal quality detector 33 comprises the AVC voltage which is coupled between line 42 and ground.

The automatic direction finding system shown in Fig. 2 of the drawing is designed to sample at 17 a received signal bearing over a given predetermined period before transmitting it to the central control station. The bearing signal quality detector 33 shown in Figs. 3 and 4 evaluates the quality of bearing signal during the predetermined period during which the system samples the received bearing, and then the bearing signal quality detector circuit is recycled to sample the quality of the received bearing signals during successive predetermined periods.

In the circuit of Fig. 4 the input AVC voltage from the direction finder receiver is coupled to line 42 and fed to the grid of each of the electron discharge devices 43, 44, 45 and 46 through resistors 47, 48, 49 and 50 respectively. As shown in curve 24 of Fig. 3 the AVC voltage can normally be expected to vary between 5 and 30 volts negative of direct voltage. Simultaneously the servo motor voltage is coupled to line 40 and thus across voltage divider 41 comprising resistance elements 41a, 41b, 41c and 41d. Obviously the voltage divider 41 is in parallel with the servo motor 32. The servo motor voltage can normally be expected to vary between 0 and 100 volts positive of alternating voltage. The full AVC voltage, i. e., the total voltage across the resistance voltage divider 41, is coupled through capacitor 51 to the grid of the first electron discharge device 43. A lesser portion of the AVC voltage, for example 53%, i. e., the voltage across resistors 41b, 41c and 41d is coupled via line 52 and through capacitor 53 to the grid of electron discharge device 44. The voltage across resistance elements 41c and 41d, for example 23% of the total AVC voltage is coupled to the grid of the third electron discharge device 45 over line 54 and via capacitor 55. The AVC voltage across resistance element 41d, for example approximately 13% of the total AVC voltage input is fed to the grid of the fourth electron discharge device over line 56 and capacitor 57.

During the given predetermined period when the bearing signal is being sampled by the direction finder receiver, if the total input servomotor voltage which is positive, at all times remains lower than the input AVC voltage which is negative, none of the electron discharge devices 43—46 will conduct. When none of the tubes 43—46 conducts the armatures 58—61 of relays 62—65 remain in contact with the lower or bottom contacts 66—69. With the armatures 58—61 engaging contacts 66—69 and the B+ plate potential coupled through the armatures 58—61 and contacts 66—69 to the output marked "A," which is indicative of the maximum bearing quality indication corresponding to maximum AVC voltage and minimum servo voltage during the predetermined period, represents the greatest reliability in the received bearing. Thus as long as the negative AVC voltage exceeded the positive servomotor voltage the output signal is obtained from "A." As the servomotor input voltage becomes increasingly higher, thus indicating a less dependable bearing signal, a point is reached where the positive servo voltage exceeds the AVC voltage for at least $\frac{1}{10}$ of a second. The $\frac{1}{10}$ of a second time element is introduced by the capacitors 70—73 which are coupled across the coils 74—77 of relay 62—65 in the plate circuit of electron tubes 43—46. When the servomotor voltage exceeds the AVC voltage the relay 62 associated with tube 43 is "locked-up" by conduction in tube 43 thus activating armature 58 to engage contact 78. When armature 58 engages contact 78 the B+ plate potential is removed from output "A" and coupled to output "B" indicating that the bearing quality is of the second order or degree. Since the second electron discharge device 44 has only a portion of the input servo voltage (approximately 53%) coupled to its grid due to the voltage drop across voltage divider 41, the bearing signal quality has to be somewhat worse, i. e., the servomotor voltage somewhat greater, before the servomotor voltage coupled to the grid of tube 44 exceeds the AVC voltage coupled to the grid of tube 44. When 53% of the servomotor voltage exceeds the AVC voltage, the relay 63 associated with tube 44 which under this condition will conduct, locks-up and the armature 59 is caused to engage contact 79 causing the B+ plate potential to be coupled to output "C" indicative of the third order or degree of bearing signal quality. Obviously when armature 59 engages contact 79 the plate potential is removed from the plate of tube 43 which thereupon ceases to conduct. Since tube 44 was fed with about 53% of the servo voltage, the bearing signal has to be somewhat less dependable before relay 63 locks-up and transfers the output to "C." Since the third and fourth tubes 45 and 46 have still less portions of the input servo voltage (23% and 13% respectively) the dependability of the bearing signal is still less before relays 64 and 65 lock-up coupling armatures 60 and 61 to contacts 80 and 81 respectively and transferring the plate potential to outputs "D" and "E" and simultaneously removing the voltage from the preceding tubes.

As each relay 62—65 locks-up the second armature 82—85 respectively is connected to contacts 86—89 respectively. At the end of the predetermined period for obtaining the bearing, switch 90 is closed, preferably automatically, which removes the potential from the plate of any conducting tube and recycles the bearing signal detector circuit of this invention.

Of course it is obvious that the quality outputs "A"-"E" may be fed to relays in the data transmission system 17 so that the quality indication may be transmitted to the central control station.

While I have described above the principles of my invention in connection with specific apparatus, it is to be clearly understood that this description is made only by way of example and not as a limitation to the scope of my invention as set forth in the objects thereof and in the accompanying claims.

I claim:

1. A receiving system adapted to determine the bearing of a detected signal comprising means for developing a first signal representative of the strength of said detected signal, a reference signal source, means for comparing a given characteristic of said detected signal and said reference signal to produce a second signal, and means for developing an output signal according to the ratio of said first and second signals.

2. A receiving system adapted to determine the bearing of a detected signal comprising means for developing a first signal proportional to the strength of said detected signal, a reference signal source, means for comparing the phase of said reference signal and said detected signal to produce a second signal, and means for producing output signals responsive to the ratio of the magnitudes of said first and second signals.

3. A system according to claim 2 wherein said output signals are responsive to the algebraic addition of the magnitudes of said first signal and at least a predetermined percentage of said second signal.

4. A bearing signal quality evaluator for use in a direction finder receiver system adapted to determine the bearing of a detected signal and including at least means to generate an automatic volume control voltage responsive to the strength of said detected signal, means for developing a first signal proportional to said automatic volume control voltage, means for developing a reference signal, means for comparing the phase of said reference signal and said detected signal and means for developing a second signal responsive to the output of said phase comparison means; said evaluator comprising first means to compare the magnitude of said first signal with the magnitude of said second signal over a predetermined period of time, means to produce an output signal when said first signal exceeds said second signal for substantially the total portion of said predetermined period, second means to compare said first signal with a predetermined portion of said second signal to produce an output signal when said second signal exceeds said first signal during said predetermined portion of time.

5. A bearing signal quality evaluator for use in a direction finder receiver system adapted to determine the bearing of a detected signal and including at least means to generate an automatic volume control voltage responsive to the strength of said detected signal, means for developing a first voltage proportional to said automatic volume control voltage, means for developing a reference signal, means for comparing the phase of said reference signal and said detected signal and servo control means having means for developing an error voltage responsive to the output of said phase comparison means, servo amplifier means to amplify said error voltage and servo motor means to control the output of said phase comparison means responsive to said amplified error voltage; said evaluator comprising means to compare said first voltage with at least a portion of said amplified error voltage, and means to develop an output voltage responsive to the output of said comparison means.

6. An evaluator according to claim 5 wherein said means to compare said first voltage with at least a portion of said amplified error voltage comprises a plurality of electron discharge devices, each having at least a cathode, anode and control grid, means to couple said first voltage to each of said control grids and means to couple a different percentage of the said amplified error voltage to each of said control grids whereby each of said electron discharge devices is rendered conductive when the said percentage of amplified error voltage coupled to the control grid exceeds the magnitude of said first voltage coupled to said control grid.

7. An evaluator according to claim 6 which further includes a relay associated with each of said electron discharge devices responsive to the conduction of said device, a source of plate potential coupled through said relays to said anodes whereby as each of said electron discharge devices is rendered conductive the plate potential source is decoupled from preceding electron discharge devices.

8. In a direction finder receiver system having a circuit developing an automatic volume control voltage and a servo control system including a servo motor responsive to an error signal proportional to the difference of a given characteristic between a detected received signal and a reference signal, comprising means to obtain a plurality of signals each proportional to a different percentage of said error signal, means to algebraically compare each of said plurality of signals with said automatic volume control voltage and means to determine which of said plurality of signals exceeds said automatic volume control signal.

9. A system according to claim 8 wherein said means to obtain a plurality of signals each proportional to a different percentage of said error signal comprises a voltage divider, means to apply said error signal across said voltage divider and means to tap said voltage divider at a plurality of points.

10. A system according to claim 8 wherein said means to algebraically compare each of said plurality of signals with said automatic volume control comprises a plurality of electron discharge devices each including at least a control grid, means to apply each of said plurality of signals to the grid of one of said discharge devices and means to apply said automatic volume control voltage to the grids of said discharge devices whereby each of said discharge devices is rendered conductive when said automatic volume control voltage is exceeded by the percentage of error signal applied to said device.

11. A system according to claim 10 which further includes a plurality of relays each associated with one of said discharge devices, said relay being actuated when its associated discharge device is rendered conductive.

References Cited in the file of this patent

UNITED STATES PATENTS

| | | |
|---|---|---|
| 2,008,563 | Sarbey | July 16, 1935 |
| 2,462,853 | Frum | Mar. 1, 1949 |
| 2,479,881 | Wagner | Aug. 23, 1949 |
| 2,483,399 | Burroughs | Oct. 4, 1949 |
| 2,312,357 | Odquist | Mar. 2, 1943 |
| 2,672,608 | Ringoen | Mar. 16, 1954 |